(12) United States Patent
Dobrowski et al.

(10) Patent No.: US 7,924,774 B2
(45) Date of Patent: Apr. 12, 2011

(54) CONTROL SYSTEM WITH PREDICTIVE FIELD DEVICE RESPONSE TIME OVER A WIRELESS NETWORK

(75) Inventors: Patrick M. Dobrowski, Burnsville, MN (US); Eric R. Lovegren, Big Lake, MN (US); Kelly M. Orth, Apple Valley, MN (US); Kyle L. Stotz, Plymouth, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 553 days.

(21) Appl. No.: 11/652,392

(22) Filed: Jan. 11, 2007

(65) Prior Publication Data

US 2007/0165656 A1     Jul. 19, 2007

Related U.S. Application Data

(60) Provisional application No. 60/758,167, filed on Jan. 11, 2006.

(51) Int. Cl.
*H04W 4/00* (2009.01)
(52) U.S. Cl. ........... 370/328; 455/423; 709/224; 710/18
(58) Field of Classification Search .................. 370/406, 370/311, 503, 328, 338, 335; 455/41.2, 519, 455/423; 709/224; 700/295; 713/300
See application file for complete search history.

(56) References Cited

U.S. PATENT DOCUMENTS

| | | | |
|---|---|---|---|
| 5,502,639 A * | 3/1996 | Fukunaga et al. | 701/41 |
| 5,560,021 A | 9/1996 | Vook et al. | |
| 5,862,391 A * | 1/1999 | Salas et al. | 713/300 |
| 6,185,208 B1 | 2/2001 | Liao | |
| 6,301,527 B1 | 10/2001 | Butland et al. | |
| 6,374,311 B1 | 4/2002 | Mahany et al. | |
| 6,711,166 B1 | 3/2004 | Amir et al. | |
| 6,731,946 B1 | 5/2004 | Stanwood et al. | |
| 6,775,276 B1 | 8/2004 | Beser | |
| 6,826,607 B1 * | 11/2004 | Gelvin et al. | 709/224 |
| 6,832,251 B1 * | 12/2004 | Gelvin et al. | 709/224 |
| 6,859,831 B1 * | 2/2005 | Gelvin et al. | 709/224 |
| 6,891,838 B1 | 5/2005 | Petite et al. | |

(Continued)

FOREIGN PATENT DOCUMENTS

WO    WO03/023536    3/2003

(Continued)

OTHER PUBLICATIONS

Acromag Incorporated, "Introduction to PROFIBUS DP", Profibus/RS485 Network I/O Modules, Technical Reference. 2002.

*Primary Examiner* — Jinsong Hu
*Assistant Examiner* — Nathan Taylor
(74) *Attorney, Agent, or Firm* — Kinney & Lange, P.A.

(57) ABSTRACT

A host computer communicates with field devices by sending control messages and receiving response messages over a wireless network. When the host computer sends a control message to the wireless network, the host computer is provided with a predictive response time within which the field device receiving the message will respond. The wireless network cycles between a sleep state and an active state based upon a wireless network power cycle. The predicted response time is based upon the current state of the wireless network, the power cycle, and the time required for the field device to turn on, take an action (such as measuring a parameter), and generating a response message.

18 Claims, 4 Drawing Sheets

U.S. PATENT DOCUMENTS

| | | |
|---|---|---|
| 6,971,063 B1 | 11/2005 | Rappaport et al. |
| 7,010,294 B1 | 3/2006 | Pytosia et al. |
| 7,042,352 B2 | 5/2006 | Kates |
| 7,114,388 B1 | 10/2006 | French et al. |
| 7,130,915 B1 * | 10/2006 | Rustad ................ 709/232 |
| 7,233,745 B2 | 6/2007 | Loechner |
| 7,246,045 B1 | 7/2007 | Rappaport et al. |
| 7,289,016 B2 * | 10/2007 | Luebke et al. ........... 340/309.16 |
| 7,339,489 B2 | 3/2008 | Arita et al. |
| 7,437,596 B2 | 10/2008 | McFarland |
| 7,505,734 B2 | 3/2009 | Ratiu et al. |
| 7,660,285 B2 * | 2/2010 | Xiong et al. ............... 370/338 |
| 2002/0065631 A1 | 5/2002 | Loechner |
| 2002/0178273 A1 * | 11/2002 | Pardo-Castellote et al. .. 709/230 |
| 2003/0171827 A1 | 9/2003 | Keyes et al. |
| 2004/0001084 A1 | 1/2004 | Shrinidhi et al. |
| 2004/0023651 A1 * | 2/2004 | Gollnick et al. ............ 455/423 |
| 2004/0032853 A1 | 2/2004 | D'Amico et al. |
| 2004/0190707 A1 | 9/2004 | Ljubicich |
| 2004/0229623 A1 | 11/2004 | Rappaport et al. |
| 2004/0239524 A1 | 12/2004 | Kobayashi |
| 2004/0239525 A1 | 12/2004 | Kobayashi |
| 2004/0259533 A1 | 12/2004 | Nixon et al. |
| 2004/0259554 A1 | 12/2004 | Rappaport et al. |
| 2004/0259555 A1 | 12/2004 | Rappaport et al. |
| 2005/0099289 A1 | 5/2005 | Arita et al. |
| 2005/0102443 A1 * | 5/2005 | Mahany et al. ................ 710/18 |
| 2005/0102529 A1 | 5/2005 | Buddhikot et al. |
| 2005/0119001 A1 | 6/2005 | Watanabe |
| 2005/0122929 A1 | 6/2005 | Zuniga |
| 2005/0135379 A1 | 6/2005 | Callaway, Jr. et al. |
| 2005/0147119 A1 | 7/2005 | Tofano |
| 2005/0149940 A1 | 7/2005 | Calinescu et al. |
| 2005/0164684 A1 | 7/2005 | Chen et al. |
| 2005/0192727 A1 | 9/2005 | Shostak et al. |
| 2005/0201349 A1 | 9/2005 | Budampati |
| 2005/0238058 A1 | 10/2005 | Pierce, Jr. et al. |
| 2005/0249137 A1 | 11/2005 | Todd et al. |
| 2005/0275527 A1 | 12/2005 | Kates |
| 2005/0281215 A1 | 12/2005 | Budampati et al. |
| 2005/0282494 A1 | 12/2005 | Kossi et al. |
| 2006/0002368 A1 | 1/2006 | Budampati et al. |
| 2006/0148410 A1 | 7/2006 | Nelson et al. |
| 2006/0219861 A1 | 10/2006 | Wood |
| 2006/0227729 A1 | 10/2006 | Budampati et al. |
| 2006/0229086 A1 | 10/2006 | Broad et al. |
| 2006/0256722 A1 | 11/2006 | Taha et al. |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0002804 A1 * | 1/2007 | Xiong et al. ............... 370/335 |
| 2007/0030816 A1 | 2/2007 | Kolavennu |
| 2007/0030832 A1 | 2/2007 | Gonia et al. |
| 2007/0071006 A1 | 3/2007 | Bosch et al. |
| 2007/0112982 A1 | 5/2007 | Sichner et al. |
| 2007/0165656 A1 * | 7/2007 | Dobrowski et al. ........... 370/401 |
| 2007/0257791 A1 | 11/2007 | Arita et al. |
| 2007/0258508 A1 | 11/2007 | Werb et al. |
| 2008/0298275 A1 | 12/2008 | De Sousa |
| 2009/0222541 A1 | 9/2009 | Monga et al. |

FOREIGN PATENT DOCUMENTS

WO   WO2005/050894 A2   6/2005

\* cited by examiner

| WIRELESS PROTOCOL BITS | PAYLOAD | WIRELESS PROTOCOL BITS |
|---|---|---|
| 72 | 74 | 76 |

*FIG. 3*

| PREAMBLE | DELIMITER | FIELD DEVICE ADDRESS | COMMAND | BYTE COUNT | DATA | CHECK BYTE |
|---|---|---|---|---|---|---|
| 82 | 84 | 86 | 88 | 90 | 92 | 94 |

*FIG. 4*

| DELIMITER | FIELD DEVICE ADDRESS | COMMAND | BYTE COUNT | DATA | MESSAGE ID | CHECK BYTE (RECALCULATED) |
|---|---|---|---|---|---|---|
| 84 | 86 | 88 | 90 | 92 | 96 | 94 |

*FIG. 5*

CONTROL SYSTEM WITH PREDICTIVE FIELD DEVICE RESPONSE TIME OVER A WIRELESS NETWORK

CROSS-REFERENCE TO RELATED APPLICATIONS

This application claims priority from a provisional application entitled LOW POWER WIRELESS NETWORKS OF FIELD DEVICES, Ser. No. 60/758,167, filed on Jan. 11, 2006, which is incorporated by reference.

Reference is also made to applications filed on even date with this application: CONTROL OF FIELD DEVICE ON LOW POWER WIRELESS NETWORKS, Ser. No. 11/652,393; CONTROL SYSTEM WITH WIRELESS ADDRESS DOMAIN TO FIELD DEVICE ADDRESS DOMAIN TRANSLATION, Ser. No. 11/652,400; VISUAL MAPPING OF FIELD DEVICE MESSAGE ROUTES IN A WIRELESS MESH NETWORK, Ser. No. 11/652,398; SELECTIVE ACTIVATION OF FIELD DEVICES IN LOW POWER WIRELESS MESH NETWORKS, Ser. No. 11/652,395; CONTROL OF LOW POWER WIRELESS NETWORKS FOR POWER CONSERVATION, Ser. No. 11/652,399; and CONTROL SYSTEM WITH WIRELESS MESSAGES CONTAINING MESSAGE SEQUENCE INFORMATION, Ser. No. 11/652,401, which are incorporated by reference.

BACKGROUND OF THE INVENTION

The present invention relates to wireless networks. In particular, the invention relates to a wireless mesh network in which process control messages are communicated between a host and field devices at nodes of the wireless mesh network.

In many industrial settings, control systems are used to monitor and control inventories, processes, and the like. Often, such control systems have a centralized control room with a host computer that communicates with field devices that are separated or geographically removed from the control room.

Generally, each field device includes a transducer, which may generate an output signal based on a physical input or generate a physical output based on an input signal. Types of transducers used in field devices include various analytical equipment, pressure sensors, thermistors, thermocouples, strain gauges, flow sensors, positioners, actuators, solenoids, indicators, and the like.

Traditionally, analog field devices have been connected to the process subsystem and the control room by two-wire twisted-pair current loops, with each device connected to the control room by a single two-wire twisted pair loop. Typically, a voltage differential is maintained between the two wires of approximately 20 to 25 volts, and a current between 4 and 20 milliamps (mA) runs through the loop. An analog field device transmits a signal to the control room by modulating the current running through the current loop to a current proportional to the sensed process variable. An analog field device that performs an action under the control of the control room is controlled by the magnitude of the current through the loop, which is modulated by the ports of the process subsystem under the control of the controller.

While historically field devices were capable of performing only one function, more recently hybrid systems that superimpose digital data on the current loop have been used in distributed control systems. The Highway Addressable Remote Transducer (HART) superimposes a digital carrier signal on the current loop signal. The digital carrier signal can be used to send secondary and diagnostic information. Examples of information provided over the carrier signal include secondary process variables, diagnostic information (such as sensor diagnostics, device diagnostics, wiring diagnostics, process diagnostics, and the like), operating temperatures, sensor temperature, calibration data, device ID numbers, configuration information, and so on. Accordingly, a single field device may have a variety of input and output variables and may implement a variety of functions.

Another approach uses a digital communication bus to connect multiple field devices to the host in the control room. Examples of digital communication protocols used with field devices connected to a digital bus include Foundation Fieldbus, Profibus, Modbus, and DeviceNet. Two way digital communication of messages between a host computer and multiple field devices can be provided over the same two-wire path that supplies power to the field devices.

Typically, remote applications have been added to a control system by running very long homerun cables from the control room to the remote application. If the remote application is, for example, a half of a mile away, the costs involved in running such a long cable can be high. If multiple homerun cables have to be run to the remote application, the costs become even higher. Wireless communication offers a desirable alternative, and wireless mesh networks have been proposed for use in industrial process control systems. However, to minimize costs, it is also desirable to maintain existing control systems and communication protocols, to reduce the costs associated with changing existing systems to accommodate the wireless communication.

In wireless mesh network systems designed for low power sensor/actuator-based applications, many devices in the network must be powered by long-life batteries or by low power energy-scavenging power sources. Power outlets, such as 120 VAC utilities, are typically not located nearby or may not be allowed into the hazardous areas where the instrumentation (sensors) and actuators must be located without incurring great installation expense. The need for low installation cost drives the need for battery-powered devices communicating as part of a wireless mesh network. Effective utilization of a limited power source, such as a primary cell battery which cannot be recharged, is vital for a well functioning wireless device. Batteries are expected to last more than 5 years and preferably as long as the life of the product.

In a true wireless mesh network, each node must be capable of routing messages for itself as well as other nodes in the mesh network. The concept of messages hopping from node to node through the network is beneficial because lower power RF radios can be used, and yet the mesh network can span a significant physical area delivering messages from one end to the other. High power radios are not needed in a mesh network, in contrast a point-to-point system which employs remote nodes talking directly to a centralized base-station.

A mesh network protocol allows for the formation of alternate paths for messaging between nodes and between nodes and a data collector, or a bridge or gateway to some higher level higher-speed data bus. Having alternate, redundant paths for wireless messages enhances data reliability by ensuring there is at least one alternate path for messages to flow even if another path gets blocked or degrades due to environmental influences or due to interference.

Some mesh network protocols are deterministically routed such that every node has an assigned parent and at least one alternate parent. In the hierarchy of the mesh network, much as in a human family, parents have children, children have grandchildren, and so on. Each node relays the messages for their descendants through the network to some final destination such as a gateway. The parenting nodes may be battery-powered or limited-energy powered devices. The more descendants a node has, the more traffic it must route, which in turn directly increases its own power consumption and diminishes its battery life.

In order to save power, some protocols limit the amount of traffic any node can handle during any period of time by only turning on the radios of the nodes for limited amounts of time to listen for messages. Thus, to reduce average power, the protocol may allow duty-cycling of the radios between On and Off states. Some protocols use a global duty cycle to save power such that the entire network is On and Off at the same time. Other protocols (e.g. TDMA-based) use a local duty cycle where only the communicating pair of nodes that are linked together are scheduled to turn On and Off in a synchronized fashion at predetermined times. Typically, the link is pre-determined by assigning the pair of nodes a specific time slot for communications, an RF frequency channel to be used by the radios, who is to be receiving (Rx), and who is to be transmitting (Tx) at that moment in time.

Some protocols employ the concept of assigning links to nodes on a regular repetitive schedule and thereby enable regular delivery of updates and messages from devices in the network. Some advanced TMDA-based protocols may employ the concept of multiple active schedules, these multiple schedules running all at the same time or with certain schedules activated/deactivated by a global network controller as the need arises. For example, slow active schedules link nodes sending messages with longer periods of time (long cycle time) between messages to achieve low power consumption. Fast active schedules link nodes sending messages more rapidly for better throughput and lower latency, but result in higher power consumption in the nodes. With protocols that allow multiple active schedules, some schedules could be optimized for upstream traffic, others for downstream traffic and yet others for network management functions such as device joining and configuration. Globally activating/deactivating various schedules throughout the entire network in order to meet different needs at different times provides a modicum of flexibility for achieving advantageous trade-offs between power consumption and low latency, but applies the same schedule to all nodes and thus does not provide local optimization.

In a synchronized system, nodes will have to wait to transmit until their next predetermined On time before they can pass messages. Waiting increases latency, which can be very detrimental in many applications if not bounded and managed properly. If the pair of nodes that are linked together are not synchronized properly, they will not succeed in passing messages because the radios will be On at the wrong time or in the wrong mode (Rx or Tx) at the wrong time. If the only active schedule has a long cycle time, the time between scheduled links will be long and latency will suffer. If a fast schedule is activated, the time between scheduled links will be short but battery life will be measurably reduced over time.

Some protocols allow running a slow schedule in the background and globally activating/deactivating an additional fast schedule. Since it takes time to globally activate a fast schedule throughout the entire network and get confirmation back from all nodes that they have heard the global command, the network or sub-network remains in the less responsive mode during the transition time. Furthermore, with a globally activated fast schedule, power is wasted in all the parenting nodes in the network, even those whose descendants will not benefit from the fast schedule. These unappreciative parent nodes must listen more often on the global fast active schedule (i.e. turn their radios On to Rx more often); even though their descendants have nothing extra to send that a regular active schedule would not suffice in that portion of the network.

Some protocols may limit the number of descendants a node can have, thereby reducing the load the node must support. Other protocols may employ a combination of all of these measures to reduce average power consumption. All of these power-saving measures have the effect of reducing the availability of the nodes in the network to do the work of passing messages, thereby increasing the latency of messages delivered through the network. Duty-cycling the radio increases latency. Hopping messages from node to node increases latency. Increasing hop depth (hop count) by limiting the number of descendants increases latency. Running a slow active schedule (long cycle period) increases latency. Even globally activating a fast active schedule takes time. It is likely that the value of information diminishes with time, so the longer the latency, the less valuable the information may be.

BRIEF SUMMARY OF THE INVENTION

In a control system, a host computer interacts with field devices by sending messages to the field devices, and receiving messages from the field devices. When the transmission of message to and from the field devices is routed through a low power wireless network, the field devices are not always available for communication because the network is cycling on and off, and the field devices are only turned on when needed to respond to a message. The present invention manages delivery of messages between the host computer and the field devices as if the wireless network and the field devices were continuously powered on.

When a message is provided by the host computer to the wireless network, a predicted response time is provided to the host computer by the wireless network. The predicted response time indicates when the host computer can expect a response from the field device addressed in the message. The predicted response time can take into account the current state of the wireless network, the power cycle on which the wireless network is operating, and turn on time required for the field device to become active, perform a requested action, and generate a response message. This allows the host computer to treat the wireless network as being available on demand, even though there are time periods when the wireless network is turned off and when the field devices are turned off.

BRIEF DESCRIPTION OF THE DRAWINGS

FIG. 3 is a diagram illustrating the format of wireless messages transmitted by the wireless network.

FIG. 4 shows the format of a control message from a host to a field device based upon a control system protocol.

FIG. 5 shows one embodiment of the control message as modified to form the payload of the wireless message shown in FIG. 3.

DETAILED DESCRIPTION

Figure 1:
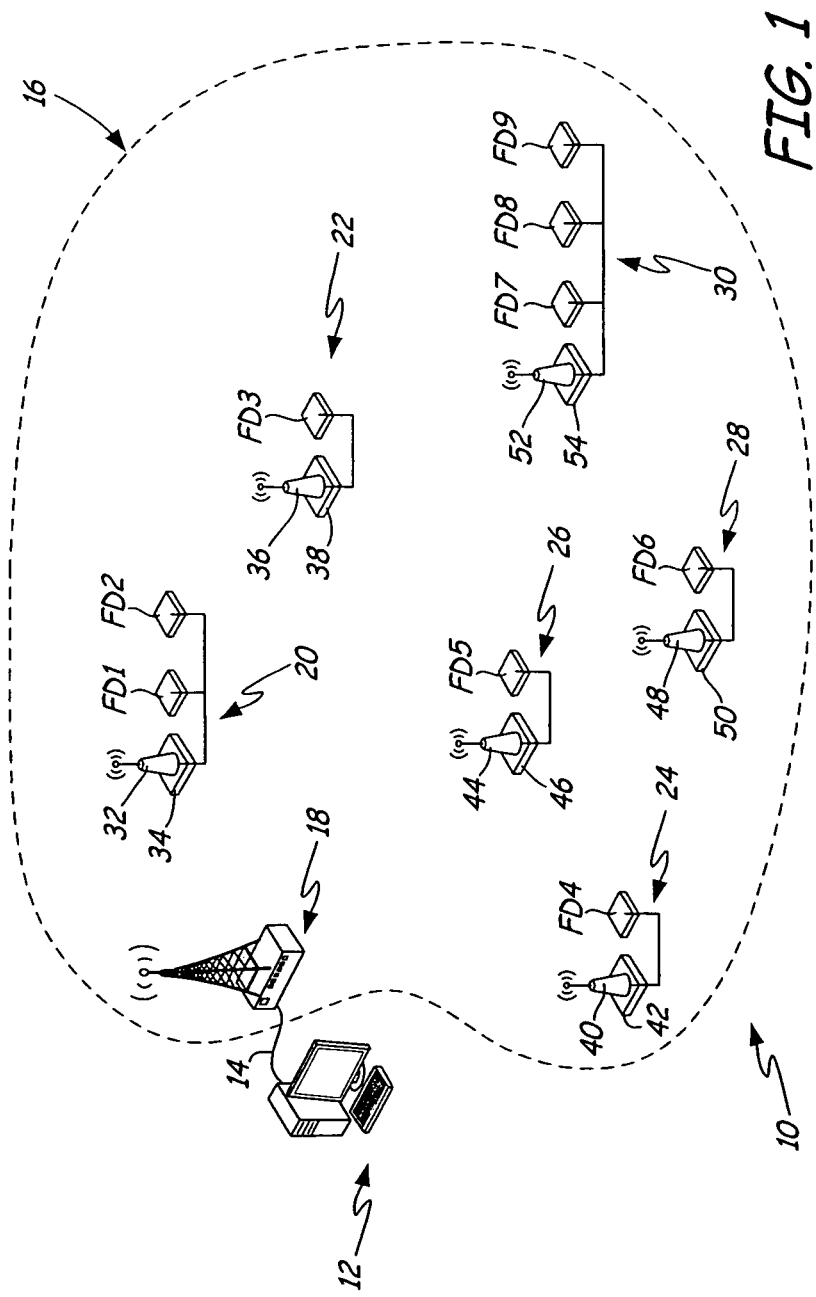
FIG. 1 is a diagram illustrating a control system in which a wireless mesh network routes wireless messages between a host and field devices.

FIG. 1 shows control system 10, which includes host computer 12, highspeed network 14, and wireless mesh network 16, which includes gateway 18 and wireless nodes 20, 22, 24, 26, 28, and 30. Gateway 18 interfaces mesh network 16 with host computer 12 over highspeed network 14. Messages may be transmitted from host computer 12 to gateway 18 over network 14, and are then transmitted to a selected node of mesh network 16 over one of several different paths. Similarly, messages from individual nodes of mesh network 16 are routed through mesh network 16 from node-to-node over one of several paths until they arrive at gateway 18 and are then transmitted to host 12 over highspeed network 14.

Control system 10 can make use of field devices that have been designed for and used in wired distributed control systems, as well as field devices that are specially designed as wireless transmitters for use in wireless mesh networks. Nodes 20, 22, 24, 26, 28, and 30 show examples of wireless nodes that include conventional field devices.

Wireless node 20 includes radio 32, wireless device router (WDR) 34, and field devices FD1 and FD2. Node 20 is an example of a node having one unique wireless address and two unique field device addresses.

Nodes 22, 24, 26, and 28 are each examples showing nodes having one unique wireless address and one unique field device address. Node 22 includes radio 36, WDR 38, and field device FD3. Similarly, field device 24 includes radio 40, WDR 42, and field device FD4; node 26 includes radio 44, WDR 46, and field device FD5, and node 28 includes radio 48, WDR 50, and field device FD6.

Node 30 has one unique wireless address and three unique field device addresses. It includes radio 52, WDR 54, and field devices FD7, FD8, and FD9.

Wireless network 16 is preferably a low power network in which many of the nodes are powered by long life batteries or low power energy scavenging power sources. Communication over wireless network 16 may be provided according to a mesh network configuration, in which messages are transmitted from node-to-node through network 16. This allows the use of lower power RF radios, while allowing the network 16 to span a significant physical area to deliver messages from one end of the network to the other.

In a wired control system, interaction between the host computer and the field devices occurs using well known control messages according to a control message protocol such as HART, Foundation Fieldbus, Profibus, or the like. Field devices capable of use in wired control systems (such as field devices FD1-FD9 shown in FIG. 1) make use of control messages according to one of the known control message protocols. Wireless nodes 20-30, which are part of wireless network 16, cannot directly exchange these well known control messages with host computer 12 because the wireless communication over network 16 occurs according to a wireless protocol that is general purpose in nature.

Rather than require host computer 12 and field devices FD1-FD9 to communicate using wireless protocol, a method can be provided to allow sending and receiving well known field device control messages between host computer 12 and field devices FD1-FD9 over wireless network 16. The well known field device control messages are embedded into the general purpose wireless protocol so that the control messages can be exchanged between host computer 12 and field devices FD1-FD9 to achieve control of an interaction with field devices FD1-FD9. As a result, wireless network 16 and its wireless communication protocol is essentially transparent to host computer 12 and field devices FD1-FD9. In the following description, the HART protocol will be used as an example of a known control message protocol, although the invention is applicable to other control message protocols (e.g. Foundation Fieldbus, Profibus, etc.) as well.

A similar issue relates to the addresses used by host computer 12 to direct messages to field devices FD1-FD9. In wired systems, the host computer addresses each field device with a unique field device address. The address is defined as part of the particular communication protocol being used, and typically forms a part of control messages sent by the host computer to the field devices.

When a wireless network, such as network 16 shown in FIG. 1 is used to route messages from the host computer to field devices, the field device addresses used by the host computer are not compatible with the wireless addresses used by the communication protocol of the wireless network. In addition, there can be multiple field devices associated with a single wireless node, as illustrated by wireless nodes 20 and 30 in FIG. 1. Wireless node 20 includes two field devices, FD1 and FD2, while wireless node 30 is associated with three field devices, FD7-FD9.

One way to deal with addresses is to require host computer 12 to use wireless addresses rather than field device addresses. This approach, however, requires host computer 12 to be programmed differently depending upon whether it is communicating over wired communication links with field devices, or whether it is communicating at least in part over a wireless network. In addition, there remains the issue of multiple field devices, which will typically have different purposes, and which need to be addressed individually.

An alternative approach uses gateway 18 to translate field device addresses provided by host computer 16 into corresponding wireless addresses. A wireless message is sent to the wireless address, and also includes a field device address so that the node receiving the message can direct the message to the appropriate field device. By translating field device addressees to corresponding wireless addresses, host computer 12 can function in its native field address domain when interacting with field devices. The presence of wireless network 16 is transparent to host computer 12 and field devices FD1-FD9.

Still another issue caused by the use of wireless network 16 to communicate between host computer 12 and field devices FD1-FD9 is the unavailability of field devices because of power conservation. In a wired control system, the host computer interacts with field devices as if they were available on demand. The assumption is that the field devices are always powered up and available.

In a low power wireless network, this is not the case. To conserve power, field devices in a low power wireless network are unavailable, or asleep, most of the time. Periodically, the wireless network goes into a non-sleep state during which messages can be communicated to and from the field devices. After a period of time, the wireless network again goes into a low power sleep state.

If the host computer attempts to communicate during a period when the wireless network is in a sleep state, or when a particular field device is in a low power sleep state, the failure of the field device to respond immediately can be interpreted by the host computer as a communication failure. The host computer does not determine the particular route that messages take through the wireless network, and does not control the power up and power down cycles for wireless communication. As a result, the host computer can interpret a lack of response of field devices as a device failure, when the lack of response is an inherent result of the way that communication takes place within a low power wireless network.

In order to make the presence of wireless network 16 transparent to host computer 12, gateway 18 decouples transmission of field device messages between host computer 12 and wireless network 16. Gateway 18 determines the current state of wireless network 16 and tracks its power cycles. In addition, it maintains information on the response times required for a field device to be turned on and then be ready to provide a response message to a control message from host computer 12.

When a message is provided by host computer 12 to gateway 18, a determination of an expected response time is made based upon the field device address. That expected response time is provided to host computer 12, so that host computer 12 will not treat the absence of a response message prior to the expected response time elapsing as a communication failure. As a result, host computer 12 is allowed to treat field devices FD1-FD9 as if they were available on demand, when in fact wireless network 16 and field devices FD1-FD9 are not available on demand.

Figure 2:
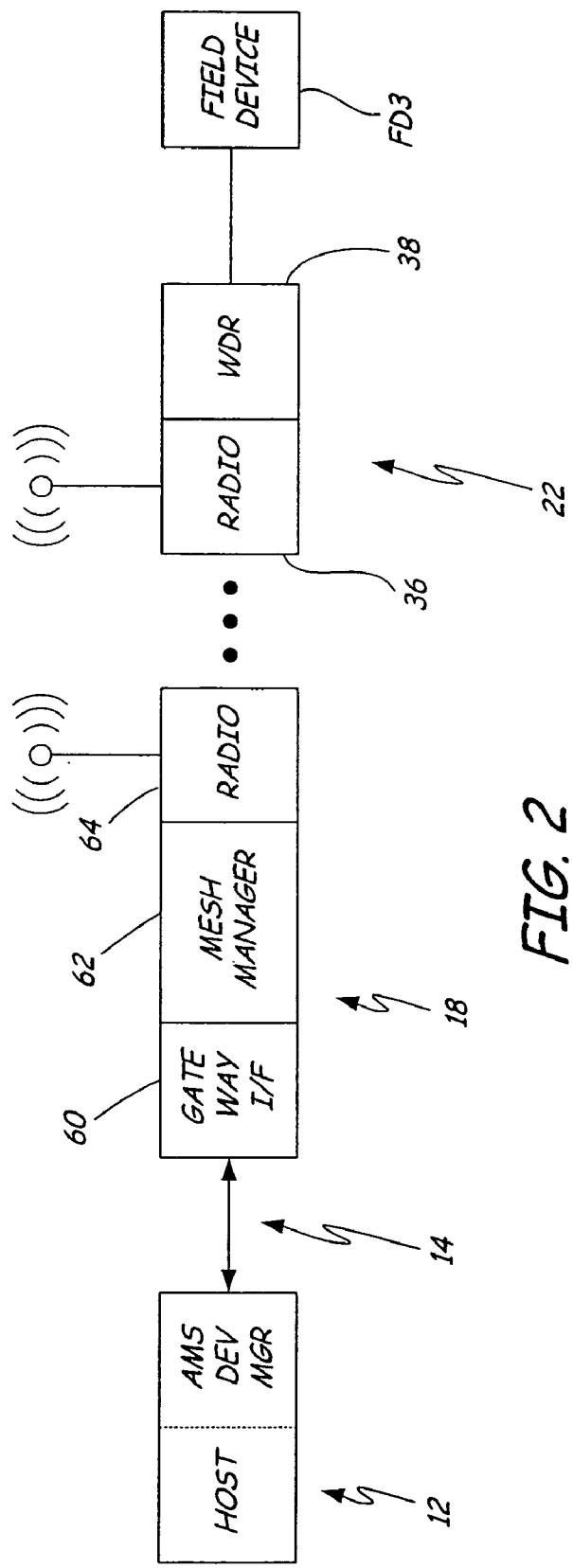
FIG. 2 is a block diagram of a portion of the control system of FIG. 1, including a host computer, a gateway node, and a wireless node with a field device.

FIG. 2 shows a block diagram of a portion of the control system 10 shown in FIG. 1. FIG. 2, host computer 12, high-speed network 14, gateway 18, and wireless node 22 are shown.

In FIG. 2, host computer 12 is a distributed control system host running application programs to facilitate sending messages to field devices FD1-FD9, and receiving and analyzing data contained in messages from field devices FD1-FD9. Host computer 12 may use, for example, AMS (tm) Device Manager as an application program to allow users to monitor and interact with field devices FD1-FD9.

Host computer 12 communicates with gateway 18 using messages in extendable markup language (XML) format. Control messages intended for field devices FD1-FD9 are presented according to the HART protocol, and are communicated to gateway 18 in XML format.

In the embodiment shown in FIG. 2, gateway 18 includes gateway interface 60, mesh manager 62, and radio 64. Gateway interface 60 receives the XML document from host computer 12, extracts the HART control message, and modifies the control message into a format to be embedded in a wireless message that will be transmitted over wireless network 16.

Mesh manager 62 forms the wireless message with the HART control message embedded, and with the wireless address of the node corresponding to the field device to which the HART message is directed. Mesh manager 62 may be maintaining, for example, a lookup table that correlates each field device address with the wireless address of the node at which the field device corresponding to that field device address is located. In this example, the field device of interest is device FD3 located at wireless node 22. The wireless message according to the wireless protocol includes the wireless node address, which is used to route the wireless message through network 16. The field device address is contained in the HART message embedded within the wireless message, and is not used for routing the wireless message through network 16. Instead, the field device address is used once the wireless message has reached the intended node.

Mesh manager 62 causes radio 64 to transmit the wireless message, so that it will be transmitted by one or multiple hops within network 16 to node 22. For example, the message to node 22 may be transmitted from gateway 18 to node 20 and then to node 22, or alternatively from gateway 18 to node 26 and then to node 22. Other routes are also possible in network 16.

Gateway interface 60 and mesh manager 62 also interact with host computer 12 to manage the delivery of control messages to field devices as if wireless network 16 were powered on even though it may be powered off (i.e. sleep mode). Mesh manager 60 determines the correct powered state of wireless network 16. It also calculates the time of the power cycles in order to determine the future time when wireless network 16 will change state from power on to off, or from power off to on. Response time can be affected if a message is sent while power is on to the wireless network, but a response will not occur until the next power on cycle. Still another factor is the start-up time of the field device. Mesh manager 62 or gateway interface 60 may maintain a data base with start-up times for the various field devices. By knowing field device address, an expected start-up time can be determined.

Based upon the current power state of wireless network 16, the amount of time before wireless network will change state, the field device's start-up time, expected network message routing time, and the potential for a response to occur in the next power on cycle rather than the current cycle, estimated times required for the message to be delivered to the field device and for the response message to return to gateway 18 can be calculated. That information can then be provided to host computer 12. Since host computer 12 will not expect a response prior to the estimated response time, the failure to receive a message prior to that time will not be treated by host computer 12 as a communication failure or field device failure.

Based upon the factors affecting response time, gateway 18 may also determine the best strategy to attempt communication with the field device given the known power cycle of wireless network 16. For example, if a power cycle is about to change from on to off, a better strategy may be to wait until the beginning of the next power on cycle to begin routing the message through wireless network 16.

As shown in FIG. 2, wireless node 22 includes radio 36, wireless device router (WDR) 38, and field device FD3. In this particular example, field device FD3 is a standard HART field device, which communicates field data using the HART control message protocol. Field device FD3 is powered on and off by, and communicates directly with, WDR 38.

The wireless message transmitted over network 16 is received at radio 36 of wireless node 22. The wireless message is checked by WDR 38 to see whether it is addressed to node 22. Since node 22 is the destination address, the wireless message is opened, and the embedded HART message is extracted. WDR 38 determines that the HART message is intended for field device FD3 based upon the field device address contained in the embedded HART message.

For power saving reasons, WDR 38 may be maintaining field device FD3 in sleep mode until some action is required. Upon receiving the HART message contained within the wireless message, WDR 38 takes steps to start up field device FD3. This may be a matter of only a few seconds, or may be, for example, a delay on the order of 30 to 60 seconds. When field device FD3 is ready to receive the HART message and act upon it, WDR 38 transmits the HART control message to field device FD3.

The message received by field device FD3 may require providing a message in response that includes measurement data or other status information. Field device FD3 takes the necessary action to gather the measurement data or generate the status information, generates a response message in the HART control format, and transmits the message to WDR 38. The HART response message is then modified and embedded into a wireless response message according to the wireless protocol, and addressed to gateway 18. WDR 38 provides the wireless response message to radio 36 for transmission onto wireless network 16. The wireless response message is then transmitted in one or multiple hops to gateway 18, where the HART response message is extracted from the wireless response message, is formatted in XML, and is transmitted over highspeed network 14 to host computer 12.

FIG. 3 shows a diagram of a typical wireless message sent over the wireless network shown in FIGS. 1 and 2. Wireless message 70 includes wireless protocol bits 72, payload 74, and wireless protocol bits 76. Protocol bits 72 and 76 are required for proper routing of wireless message 70 through mesh network 16 to the desired destination. Payload 74 represents the substance of the control message being transmitted. In the present invention, the control message (in the control message protocol used by both host computer 12 and field devices FD1-FD9) is embedded within wireless message 70 as payload 74.

FIG. 4 shows the format of control message 80 as generated by host computer 12. In this particular example, control message 80 is configured using the HART protocol. Control message 80 includes preamble 82, delimiter 84, field device address 86, command 88, byte count 90, data 92, and check byte 94. Control message 80 is modified at gateway interface 60 and then embedded into wireless message 70 as payload 74.

FIG. 5 shows the format of payload 74 formed from control message 80. To produce payload 74, interface 60 removes physical layer overhead from control message 80 and adds sequence information.

As shown by a comparison of FIGS. 4 and 5, the first difference between payload 74 and control message 80 is that preamble 82 has been removed. Since the control message will be sent over the network using the wireless protocol, the use of a preamble is unnecessary. Removal of preamble 82 improves efficiency of network 16 by eliminating unnecessary information.

The second difference between payload 74 and control message 80 is the addition of message ID 96, which is a two-byte number that follows data 92, and precedes check byte 94. The removal of preamble 82 and the addition of message ID 96 also requires that check byte 94 be recalculated.

The purpose of message ID 96 is for stale message rejection. This allows the receiver of a message to reject out of order messages. Wireless mesh network 16 is designed such that messages can take multiple paths to get to their destination. The message is passed from one node to another, and it is possible that the message may be delayed at a particular node. This could be caused by interference or poor signal quality. If a message is delayed long enough, host 12 may issue a retry and/or a new message. In that case, it is possible that one or more messages may arrive at the destination node before the delayed message is delivered. When the delayed control message is delivered, message ID 96 can be used to accept or reject the control message.

Figure 6:
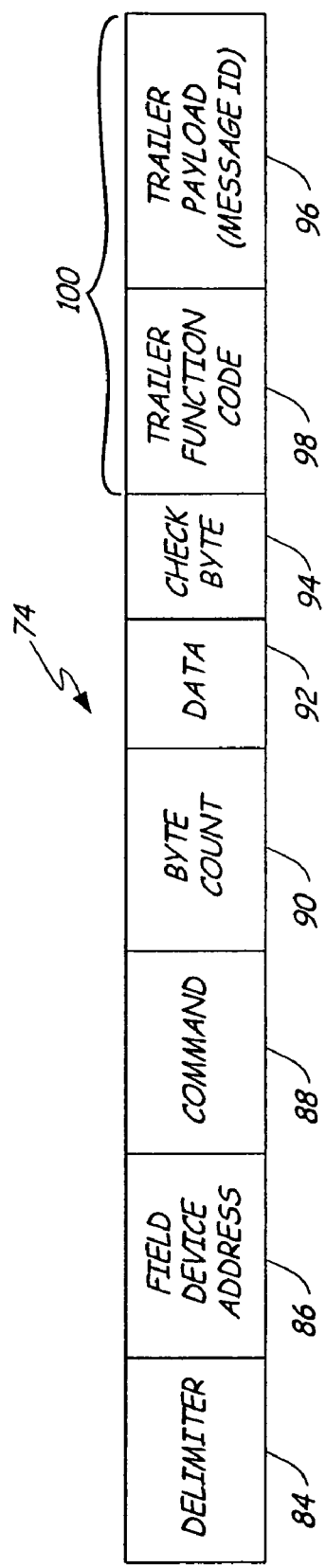
FIG. 6 shows another embodiment of the control message as modified with a trailer to form the payload of the wireless message shown in FIG. 3.

FIG. 6 shows a second embodiment of the format of payload 74, in which trailer function code 98 and trailer payload (or message ID) 96 form trailer frame 100, which is appended to the control message formed by delimiter 84, field device address 86, command 88, byte count 90, data 92 and check byte 94. Trailer 100 is not included in check byte 94, and instead depends on the wireless network protocol layers for data integrity and reliability.

Trailer 100 contains function code 98 and payload 96 (which includes the message ID, if any). Function code 98 is an unsigned byte which defines the content of trailer 100. Undefined payload bytes such as additional padding bytes will be ignored. Use of trailer 100 only applies to messages between gateway 18 and wireless field devices FD1-FD9. Table 1 shows an example of function codes defined for trailer 100:

TABLE 1

| Function Code | Meaning | Payload Length and Description |
|---|---|---|
| 0 | No Message ID | 0–2 bytes (optional padding) |
| 1 | Force Accept | 2 bytes - message ID |
| 2 | Clear Force Accept With Force | 2 bytes - message ID |
| 3 | Normal Message ID | 2 bytes - message ID |

Function codes 0–3 are used with reference to a message ID.

Message IDs are used for stale message rejection on wireless mesh network 16. This allows the receiver of a message to reject out of order messages. Additionally, message IDs can be used by gateway 18 to determine whether published data has arrived out of order.

Rules for generating the Message ID are as follows:

The message ID enumerates a message sequence from a sender to a receiver. It is a two byte unsigned value which must be unique and increasing by one with each new message ID.

A new message ID should be generated for every request/response transaction. Retries of a request from a sender to a receiver may re-use a message ID provided that there is no more than one request outstanding from a sender to a receiver. After receiving a valid request message with a valid message ID, the field device must echo back the received message ID with the response.

A new message ID should be generated for every publish message from a device. Publish message IDs are generated independently of request/response message IDs.

Rules for validating the Message ID are as follows:

The receiver must implement a window for validating message IDs so that the validity comparison survives a rollover of the message ID counter. As an example, any messages within a window of 256 previous IDs could be ignored as out of order by the WDR/field device. But, if message ID is safely outside the window the receiver should accept the message. Any accepted message will cause the message ID to be cached as the last valid received message ID.

After a restart, a receiver may accept the first message ID it receives or else it must initialize its validity-checking in whatever manner the device application sees fit. A guideline for this initialization would be for a device to always accept new stateless requests without requiring a device publish to first reach the gateway.

The receiver of a published message with an invalid (out of order) ID may either use or reject the message, depending on the receiver's application.

Rules for interpreting function codes are as follows:

A sender can send a message without a message ID by either omitting trailer 100 or by specifying NO MESSAGE ID as the function code. If a response is generated and the WDR/field device supports trailers, the return function code should be set to "NO MESSAGE ID".

If a message ID is provided, it must be accepted if the function code is set to FORCE ACCEPT or CLEAR FORCE ACCEPT WITH FORCE. A message with a function code of NORMAL ID will be subject to potential discard via the message ID validation rules.

If gateway 18 has reset, it should make its first request using the FORCE ACCEPT function code. The will force the receiving field device to accept the request and the attached message ID. This relieves gateway 18 of needing to learn the value of the device's valid message ID counter. Gateway 18 should stop using FORCE ACCEPT once it has received a valid response message with the matching message ID.

Gateway 18 should honor the CLEAR FORCE ACCEPT WITH FORCE function code as a valid message ID, but a WDR/field device should not send CLEAR FORCE ACCEPT WITH FORCE to gateway 18.

If a WDR/field device in the system has reset, it should send publish messages with the command set to FORCE ACCEPT. This will force gateway 18 to accept the published data.

If gateway 18 sees the FORCE ACCEPT function code, it may issue a CLEAR FORCE ACCEPT WITH FORCE in a subsequent message along with a valid message ID.

On receipt of CLEAR FORCE ACCEPT WITH FORCE, the WDR/field device should clear the force accept condition and always accept the message ID provided.

The use of embedded control messages (in a control message protocol) within wireless messages (in a wireless protocol) enables the host computer of a distributed control system to interact with field devices through a wireless communication network. Control messages can be exchanged between the host computer and the field devices using known control message formats, such as HART, Fieldbus, or the like, without having to be modified by either the host computer or the field devices to accommodate transmission of the control messages over the wireless network. The control message is embedded within the wireless communication protocol such that the substance of the control message exchanged between the host computer and the field device is unmodified as a result of having passed through the wireless network.

Control messages that are too large to be routed through the wireless communication protocol can be broken into parts and sent as multiple parts. Each part is embedded in a wireless message, and the multiple parts can be reassembled into the original control message as the multiple parts exit the wireless network. By use of a message ID in the embedded control message, the multiple parts can be reassembled in proper order, even though individual wireless messages having embedded parts of the original control message may take different paths through the wireless network.

The translation of field device addresses to corresponding wireless addresses allows host 12 to function in its native field device address domain, while interacting with field devices within the wireless address domain. The use of wireless network 16 to route messages to and from the field devices is transparent to host 12. The address translation and inclusion of both the wireless address and the field device address in the wireless message allows multiple field devices associated with a single node (i.e. a single wireless address) to be addressed individually.

Although embedding the field device address in the payload of the wireless message as part of the control message is simple and effective, the field device address could be contained separately in the payload or elsewhere in the wireless message, if desired.

The presence of wireless network 16 is also made transparent to host computer 12 by decoupling the transmission of messages to field devices between host computer 12 and wireless network 16. Gateway 18 monitors the state of wireless network 16, and factors that can affect the response time to a message. By providing an estimated response time to messages being sent by host computer 12, gateway 18 allows host computer 12 to treat what field devices FD1-FD9 and wireless network 16 as if they were available on demand, even though network 16 and field devices FD1-FD9 are often in a low power sleep state.

Although the present invention has been described with reference to preferred embodiments, workers skilled in the art will recognize that changes may be made in form and detail without departing from the spirit and scope of the invention. For example, control system 10 is illustrated with six nodes and nine field devices, but other configurations with fewer or greater numbers of nodes and field devices are equally applicable.

The invention claimed is:

1. A control system comprising:
   a plurality of field devices;
   a host computer for sending control messages to and receiving response messages from the field devices;
   a wireless network having a plurality of wireless nodes that cycle between a sleep state and an active state according to a wireless network power cycle, at least one of the field devices being associated with each node; and
   a gateway between the host computer and the wireless nodes; the gateway providing the host computer, in response to a message addressed to one of the field devices, a predicted time value of when the field device will respond to the message based on the conditions comprising whether the wireless network is currently active or asleep and the amount of time left before the wireless network becomes active or goes to sleep, wherein the host computer determines whether a communication with one of the field devices has failed based on the expiration of the predicted time value.

2. The control system of claim 1, wherein the gateway controls cycling of the wireless nodes between the sleep state and the active state.

3. The control system of claim 1, wherein the gateway provides the predicted time value based at least in part upon a field device turn-on time.

4. The control system of claim 1, wherein the field devices have a sleep state and an active state.

5. The control system of claim 4, wherein the wireless nodes control whether the field devices associated with them are in the sleep state or the active state.

6. The control system of claim 5, wherein the wireless nodes selectively turn on the field devices in response to control messages from the host computer.

7. The control system of claim 6, wherein the gateway stores information regarding time required by each field device to respond to a control message after being turned on to an active state.

8. The control system of claim 7, wherein the gateway provides the predicted time value based in part on the stored information regarding time required by the field device to which the control message is addressed.

9. The control system of claim 1, wherein the gateway determines whether the field device to which the control message is addressed will be able to respond during a current active state of the wireless nodes, and provides the predicted time value based at least in part on that determination.

10. A method of communicating between a host computer and field devices, the method comprising:
    delivering a control message addressed to a selected field device from the host computer to a wireless network;
    providing to the host computer a predicted response time for a response from the selected field device based on the conditions comprising whether the wireless network is currently active or asleep and the amount of time left before the wireless network becomes active or goes to sleep wherein the host computer determines whether a communication with the selected field device has failed based on the expiration of the predicted response time;
    periodically turning on the wireless nodes to transmit and receive messages;

transmitting a control message to a selected field device over the wireless network to a wireless node associated with the selected field device;

turning on the field device in response to a control message received that is addressed to the selected field device;

generating a response message from the selected field device; transmitting the response message over the wireless network; and delivering the response message to the host.

11. The method of claim 10, wherein the predicted response time is based at least in part on a determination of whether the selected field device can respond to the control message before the wireless network switches to a sleep state.

12. The method of claim 10, wherein the predicted response time is based at least in part on stored information relating to time required for the selected field device to turn on, take action based upon the control message, and generate a response message.

13. The method of claim 10, wherein the host computer treats the selected field device as available if a response message is received with the predicted response time.

14. A control system comprising:

a plurality of field devices;

a host computer for sending control messages to and receiving response messages from the field devices;

a plurality of wireless nodes that cycle between a sleep state and an active state according to a wireless network power cycle, at least one of the field devices being associated with each node; and a gateway between the host computer and the wireless nodes;

the gateway providing the host computer, in response to a message addressed to one of the field devices, a predicted time value of when the field device will respond to the message based on the conditions comprising a field device turn-on time and a field device response time, wherein the gateway stores information regarding time required by each field device to respond to a control message after being turned on to an active state, wherein the host computer determines whether a communication with one of the field devices has failed based on the expiration of the predicted time value.

15. The control system of claim 14, wherein the field devices have a sleep state and an active state.

16. The control system of claim 15, wherein the wireless nodes control whether the field devices associated with them are in the sleep state or the active state.

17. The control system of claim 16, wherein the wireless nodes selectively turn on the field devices in response to control messages from the host computer.

18. The control system of claim 14, wherein the gateway provides the predicted time value based at least in part upon a current state of the wireless network and the wireless network power cycle.

* * * * *